UNITED STATES PATENT OFFICE.

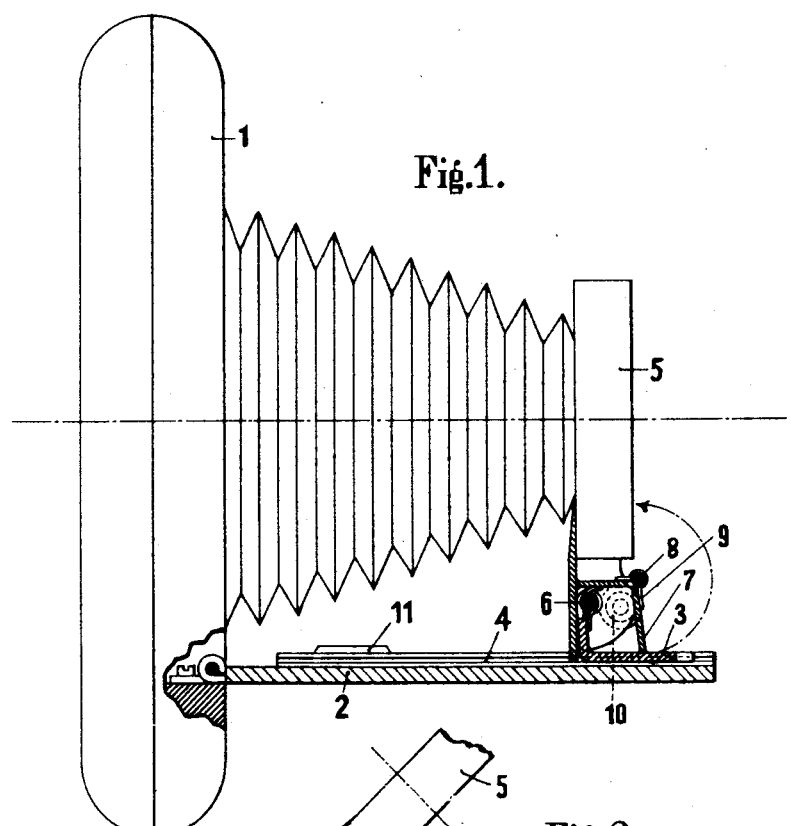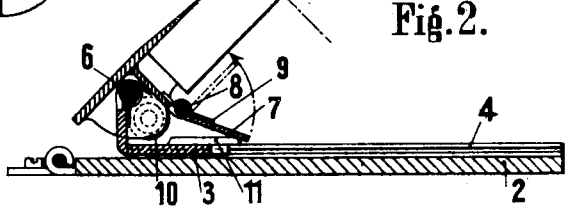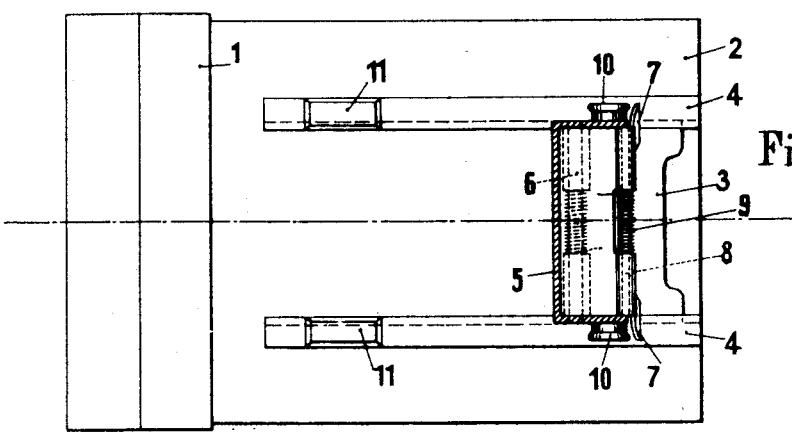

WILHELM KABELITZ, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

FOLDING CAMERA.

1,196,116.  Specification of Letters Patent.  Patented Aug. 29, 1916.

Application filed December 5, 1913. Serial No. 804,944.

*To all whom it may concern:*

Be it known that I, WILHELM KABELITZ, a citizen of the German Empire, and resident of Friedenau, near Berlin, Germany, have invented certain new and useful Improvements in Folding Cameras, of which the following is a specification.

This invention relates to folding cameras wherein the objective holder is hinged to a carriage sliding on a run-way so that when the carriage is pushed back the camera can be closed by folding over the objective holder in relation to the carriage, without the carriage leaving the guides on the runway.

The invention consists of a device for fixing the objective holder in relation to the carriage, in position for use and comprises a supporting plate hinged to the objective holder and adapted to abut with its lower edge against the carriage or against its carrier in such a way that depending from the angle which this supporting plate makes with the plane of the run-way such plate prevents or allows rotation of the objective holder with relation to the carriage.

An embodiment of the invention is shown on the accompanying drawing where—

Figure 1 shows a side view and partly a longitudinal section through a camera connected with the new locking device. Fig. 2 is a vertical section of the run-way with part of the objective holder in intermediate position. Fig. 3 is a plan view of the camera of Fig. 1 with the bellows and objective carrying board removed.

The camera casing is designated 1, the run-way 2, the objective carriage 3, the rails 4, and the objective holder 5. The joint connecting the carriage to the objective holder is designated 6; 7 designates the supporting plate, the hinge-pin of which is designated 8 and is located in front of the hinge-pin 6 at the front part of the objective holder 5. A spring 9 tends to hold the plate 7 continuously against the top of the carriage 3.

10 designates lateral knobs at the foot of the objective holder, serving for pulling the same forward and pushing it back on the guides 4.

11 designates elevations at the rear ends of the rails 4.

The operation of the camera is as follows: After opening the run-way 2 the objective carriage and holder are pulled out by means of the knobs 10. The foot of the supporting plate 7 first slides on the elevations 11 of the rails 4 and is held at such an angle to the run-way that while the plate is on these elevations 11 the objective holder can be folded over at any time. As soon as the bottom edge of the plate 7 leaves the elevations 11 the plate 7 is erected by the spring 9, in relation to the plane of the runway, and is thus moved to its supporting position, whereby rotation of the holder 5 at the joint 6 is prevented by the plate 7. As the spring 9 always tends to hold the foot of the supporting plate against the base, in the construction illustrated against the top of the objective carriage, it constantly tends to press the objective holder, in the position shown in Fig. 1, against the upright part of the objective carriage.

What I claim is:

1. In a folding camera in combination with a run-way hinged to a camera casing, a carriage movable on said run-way, an objective holder hinged to said carriage, a supporting plate hinged to said objective holder for supporting said objective holder in operative position, and means on said run-way for engaging said supporting plate to permit of the folding of said runway when the objective holder has been moved into closed position.

2. In a folding camera in combination with a run-way hinged to the camera casing, a carriage movable on said run-way and an objective holder hinged to the carriage, a supporting plate hinged to the objective holder at a point substantially in front of the hinge connecting the objective holder with the carriage and adapted to bear with its free edge against a carrying member for the objective holder so as to prevent the objective holder from being folded about its joint and means provided on the run-way for automatically deflecting the hinged supporting plate from the position where it locks the objective holder on pushing the carriage and objective holder toward the casing.

3. In a folding camera in combination with a run-way hinged to the camera casing, a carriage movable on said run-way and an objective holder hinged to the carriage, a supporting plate hinged to the objective holder and adapted to lock the objective holder in operative position and abutments provided on the run-way having the form of elongated elevations extending toward the front edge of the run-way adapted to coöperate with the free edge of the supporting plate on pushing the carriage toward the camera casing and to deflect the supporting plate from the position where locking of the objective holder takes place.

In testimony whereof I have signed this specification in the presence of two subscribing witnesses:

WILHELM KABELITZ.

Witnesses:
  HENRY HASPER,
  WOLDEMAR HAUPT.